July 2, 1968  E. L. SEARCY ET AL  3,390,864
HANDLING AND STORAGE APPARATUS FOR A SPARE TIRE
AND WHEEL ASSEMBLY ON A VEHICLE
Filed Jan. 3, 1967  2 Sheets-Sheet 1
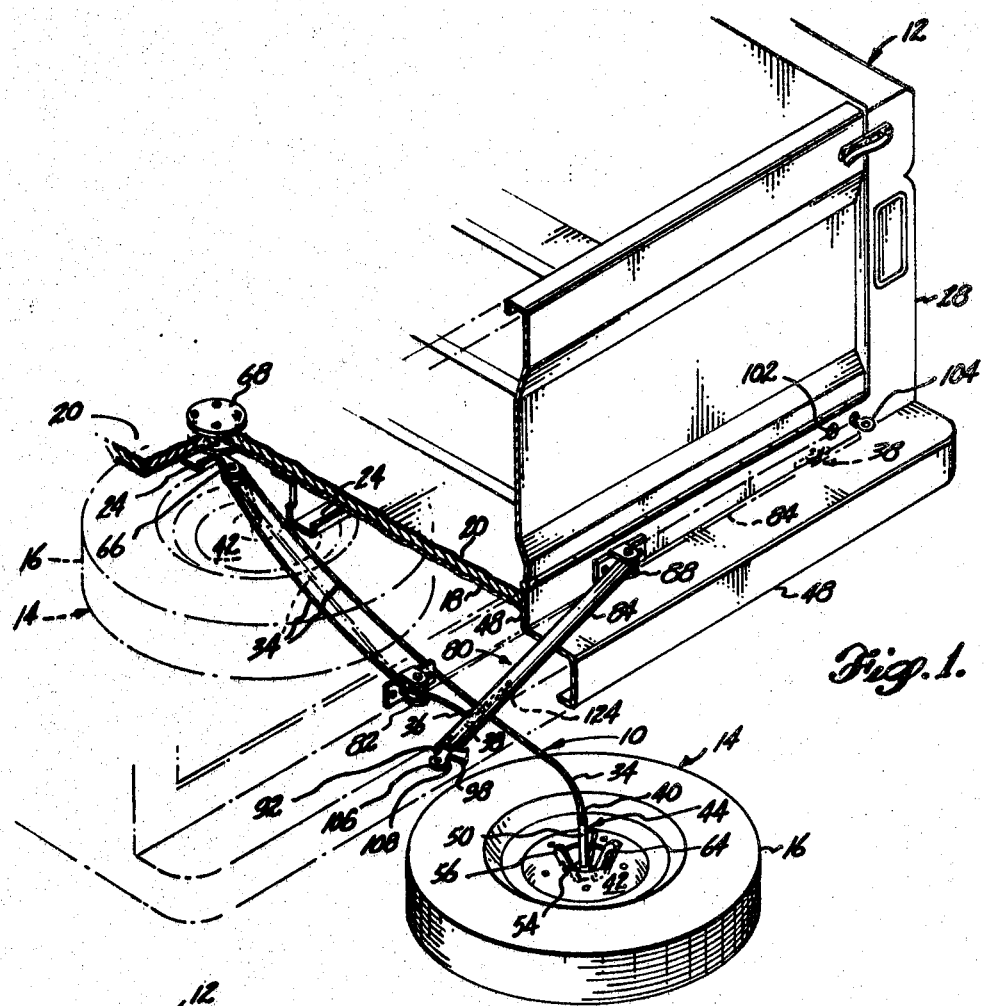
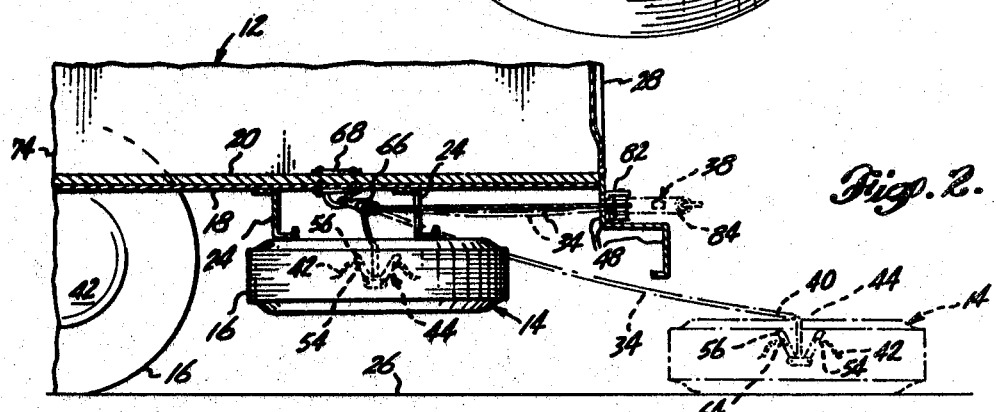
INVENTORS.
EDGAR L. SEARCY
FRED A. SEARCY
BY
Roy Mattern Jr.
ATTORNEY

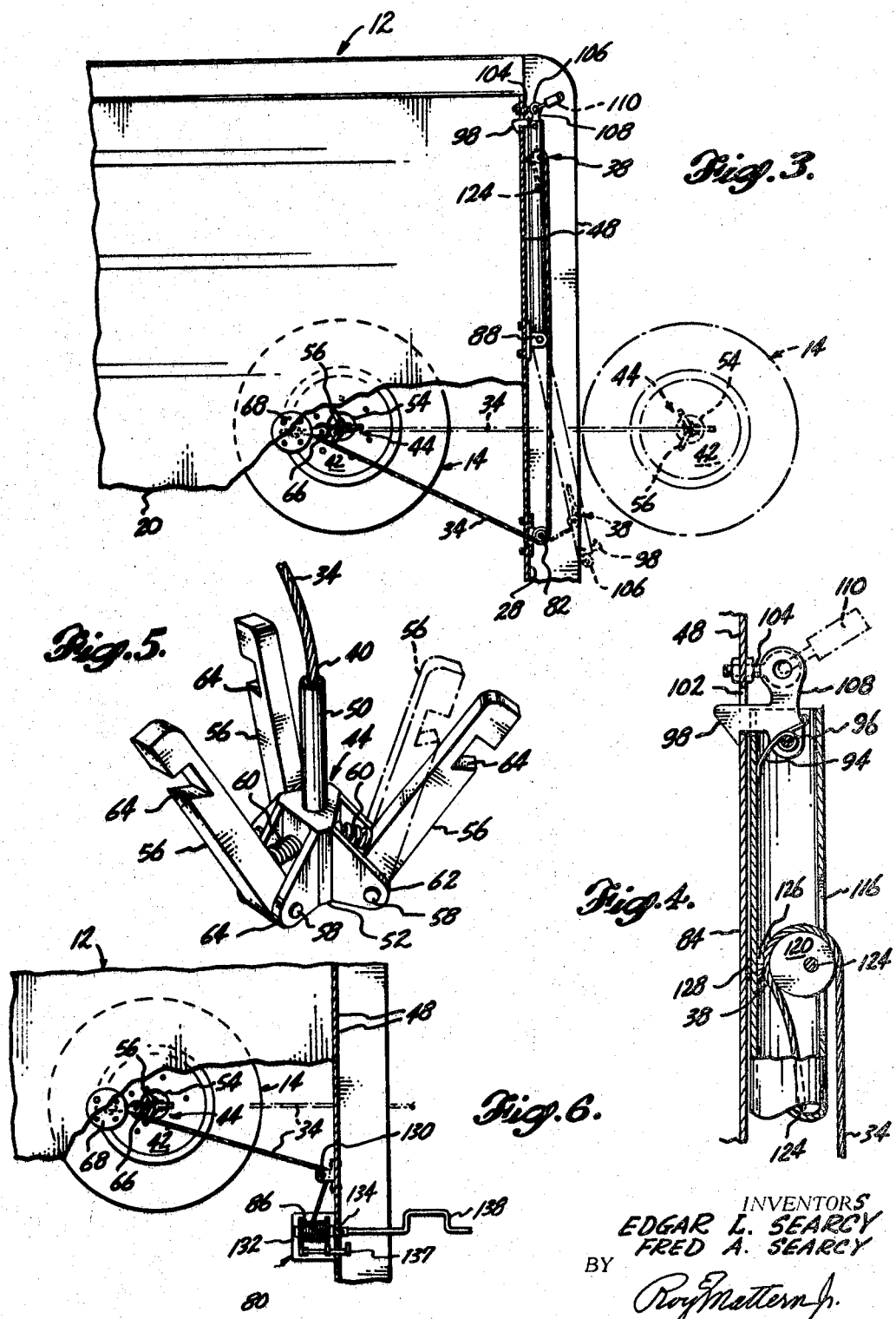

United States Patent Office 3,390,864
Patented July 2, 1968

3,390,864
HANDLING AND STORAGE APPARATUS FOR A SPARE TIRE AND WHEEL ASSEMBLY ON A VEHICLE
Edgar L. Searcy and Fred A. Searcy, Vancouver, Wash., assignors, by direct and mesne assignments, to Duane L. Burd and Ronald S. Udell, both of Yakima, Wash.
Filed Jan. 3, 1967, Ser. No. 606,826
5 Claims. (Cl. 254—166)

ABSTRACT OF THE DISCLOSURE

Handling and storage of a mounted spare tire and wheel assembly of a vehicle is undertaken by utilizing a movable connector such as a cable to control their movement from ground level immediately at the rear of the vehicle, upwards and forward to a vehicle frame or truck bed level into the first available storage volume. During such handling and storage the spare wheel and tire assembly is gripped at the wheel center and held securely by radially expanded, spring biased and notched supporting arms which are secured to the connector. Connector translating power is created by operating mechanisms such as levers and winches.

In the drawings, embodiments of the invention are illustrated as follows:

FIGURE 1 is a partial perspective view of the rear of a vehicle such as pick up truck with portions removed to illustrate an embodiment of the invention arranged in respective positions of its components just prior to commencement of lever action to draw the cable attached spare tire and wheel assembly into its "over the road" position under the vehicle;

FIGURE 2 is a partial side view of the vehicle and spare tire and wheel assembly of FIGURE 1 with portions removed to illustrate the "over the road" position in solid lines and to illustrate the accessible ground position in dotted lines inclusive of the lever and cable positions;

FIGURE 3 is a partial top view of the vehicle and spare tire and wheel assembly, of FIGURES 1 and 2, with portions removed to illustrate the "over the road" position principally in solid lines and to illustrate the accessible ground position in dotted lines inclusive of the lever and cable positions;

FIGURE 4 is an enlarged view principally in section of a rear portion of the vehicle inclusive of portions of the lever, cable and securing devices shown in FIGURES 1, 2 and 3, in their "over the road" positions;

FIGURE 5, is an enlarged perspective view of the wheel gripping and holding means which is attached to the cable as shown in the embodiment of FIGURES 1, 2, 3 and 4, and as shown in the embodiment of FIGURE 6; and FIGURE 6, is a partial top view of the vehicle and spare tire and wheel assembly with portions removed to illustrate the "over the road" position and to show the use of a winch and its accessories to move the cable.

As indicated in FIGURES 1, 2 and 3, the invention 10, although adaptable to various types and models of vehicles, is well suited to mounting on and operating with "pick up" trucks 12. Spare tire and wheel assemblies 14, already inflated for use if a running tire fails, are stored underneath a truck frame 18 below load bed structure 20. Such assemblies 14, themselves, are ready if they are removed and cleared from under truck 12.

Generally a person must crawl under truck frame 18 and first unthread one or more "holding" nuts, not shown, from bolts (not shown) which are in turn suspended from stops 24, frame 18, or bed 20. Then care must be exercised by this person as he releases and drops heavy tire mounted wheel assembly 14 to ground level 26. Thereafter he must move assembly 14 out from under truck 12 before he commences his own extraction from beneath truck frame 18 or bed 20. A person during such maneuvers could be hurt, certainly he always becomes dirty, and moreover he consumes substantial time both withdrawing and re-installing tire and wheel assembly 14 which is mounted in the locale as illustrated in FIGURE 1 or in other inaccessible locations below vehicle framing 18.

As indicated broadly in FIGURES 1 and 2 and in more detail in other accompanying FIGURES 3, 4, 5 and 6, a person is provided with means to lower away and to retrieve tire and wheel assemblies 14 while he remains at rear 28 of vehicle, such as truck 12. Furthermore replacement of such an assembly 14 is undertaken while he remains in this same rear location. At such convenient location, the person, driver, passenger or service man, is not required to leave his feet and crawl underneath truck 12 for either retrieval or return of tire and wheel assembly 14.

A cable 34 or connector of like potential such as a chain (not shown) becomes an "extended arm" of a person who is undertaking tire and wheel assembly 14 replacement. To avoid "on spot" closely supervised initial release or final securement of assembly 14, cable 34 is held at its exterior end 36 by means 38 which is observed on exterior of truck or vehicle 12. Moreover, anchoring of cable 34 at its interior end 40 to wheel 42 by means 44 is likewise done and observed from same exterior location, which is preferably rear 28 of vehicle 12.

As shown in FIGURE 1 and indicated in dotted lines in FIGURES 2 and 3, a tire and wheel assembly 14 ready to be installed is placed flat on the ground 26 just beyond rear bumper 48. The assembly gripping means 44, shown in FIGURE 5, already swaged unto cable 34 by using fitting 50, is dropped into opening 54 of wheel 42. Arms 56 are pivotally mounted, by pins 58 to spaced supports 62 on body 52 of fitting 50 and spring 60 biased outwardly from body 52. These arms 56 are spread sufficiently to insure that gripping means 44 will not pass completely through wheel opening 54 but instead means 44 will enter until notches 64 on the exterior of each arm 56 firmly engage wheel 42 about wheel opening 54, where they remain by action of springs 60.

Cable 34, commencing at swaged fitting 50 of gripping means 44, extends to and through a guiding pulley 66 which is secured by fastening assembly 68 to vehicle frame 18, body 74 or bed 20. Pulley 66 is so held at the transverse center of an underneath vehicle volume in which an inflated spare tire and wheel assembly 14 is positioned during normal vehicle operations.

From this "guiding and storage" pulley 66, cable 34 returns back to rear bumper 48. In this rear locale, depending on a selected cable take up means 80, cable 34 is either passed through another pulley called a guiding and return pulley 82 and then anchored to a lever 84 as shown in FIGURES 1, 2, 3 and 4, or secured around a winch drum 86 as shown in FIGURE 6.

As illustrated in FIGURE 1, where a lever 84 is used as take up means 80 to seemingly shorten the effective cable length to thereby draw wheel 42 from rear 28 to frame 18 of vehicle 12, lever 84 is pivotally mounted to rear bumper 48 or nearby substantial vehicle structure using a pin mounting means 88. Upon completion of a swinging take up motion, the swinging end 92 of lever 84, equipped with a spring 94 biased off center pin 96 mounted hook 98, snaps into place in a frame or bumper notch 102. Further securement and locking of take up lever 84 is undertaken by providing concentrically, eyelet structure 104 mounted on a bumper and eyelet structure 106 on the hook body 108 to receive padlock 110, as shown in FIGURE 3, or to receive other locking means.

As illustrated in FIGURE 4, in detail, cable 34 after passing through "guiding and return" pulley 82 is extended to and through an opening or slot 116 which is located in lever 84 near hook 98. After its entry through opening 116, cable 34 is passed around a pulley 120 which is eccentrically secured to take up lever 84 by pin mounting 122. Then its bitter end 124 is extended into lever 84. To aid in controlling entry and anchoring of cable 34 in lever 84 a locking shoulder structure 126 on the end of a threaded fastener 128 is adjustably mounted within an arcuate eccentric movement of pulley 120. Shoulder structure 126 serves as a guide during insertion of cable 34. Thereafter shoulder 126 serves a friction locking function with pulley 120 as it is moved off center when cable 34 is drawn taut upon lever movement. As lever 84 is swung around and locked, tire and wheel assembly 14 is thereby lifted into its over road storage location.

In FIGURE 6, where a winch 132 is used as a take up means 80 to shorten the effective cable length and thereby to draw wheel 42 from rear 28 to frame 18 of vehicle 12, cable 34 is secured to winch drum 86, after passing through pulley 130 which is secured to bumper 48. The winch 132 is preferably mounted on the vehicle body 74 just forward of the rear bumper 48. A crank access hole 134 is made through bumper 48 or body 74 so that winch 132 is operated conveniently from the rear of vehicle 12 with a crank or lug wrench 138.

To lower tire and wheel assembly 14, either lever 84 is released and swung out from bumper 48, or in the other illustrated embodiment, winch 132 is released upon movement of a pawl 137 and reversed by cranking as necessary. Spare wheel 42 upon reaching ground is easily handled by an operator of the vehicle 12. Arms 56 and their notches 64, shown in FIGURE 5, are quickly pivoted clear of center wheel opening 54 and cable 34 is pulled away. Then tire and wheel assembly 14 is ready for mounting in place of a deflated tire and wheel assembly.

Placement of the deflated tire and wheel assembly 14 or the repaired tire and wheel assembly 14 under the vehicle is quickly undertaken, as previously described, by dropping first assembly gripping means 44 into opening 54 of wheel 42. Then cable 34 is taken up by a lever 84 or by winch 132 of a respective illustrated embodiment and the assembly 14 is drawn into its "over the road" position, below vehicle 12.

Throughout either placing spare assembly 14 in use or retiring it as a standby, this spare tire and wheel handling and storage apparatus is conveniently manipulated, preferably as illustrated, from rear 28 of vehicle 12 by a driver or service man who remains on his feet. There is no need for him to be beneath vehicle 12 to release or to secure spare wheel and tire assembly 14. The spare assembly 14, securely held by gripping means 44, remains under vehicle 12 until it is intentionally lowered to ground 26 in preparation for mounting in place of a defective assembly 14. The continued gripping function of means 44 is assured because cable or cable like connector 34, when under a tensile loading, causes arms 56 to be forced into engagement with wheel 42. Under this "load" condition, the forces of springs 60 are not relied upon to keep the tire and wheel assembly 14 in place.

We claim:

1. A spare tire and wheel assembly handling and storage apparatus for a vehicle, such as a pick up truck, manipulated conveniently by a driver without going under the vehicle, comprising:

(a) a flexible connector capable of having its effective holding length selectively shortened and lengthened while at all times remaining long enough to extend out from under the vehicle, such as a cable connector;
    (b) a lever mechanism to hold, lengthen, and shorten the flexible connector, adapted for pivotal mounting on a vehicle where it may be operated by a driver standing by a vehicle, the free end of the lever receiving the flexible connector, whereupon swinging of the lever moves the flexible connector to change its effective length, shortening and lengthening the flexible connector depending on the direction of lever movement;
    (c) a fastener secured to the free end of the flexible connector to expandably grip the spare tire and wheel assembly and when under load tending to remain expanded so its holding power is continuous; and
    (d) a directional change supporting guide adapted to be secured to the vehicle where a spare tire and wheel assembly is to be mounted while a vehicle is underway, to direct and hold the flexible connector as it adjustably extends between the fastener gripping the spare tire and wheel assembly and the lever mechanism.

2. A spare tire and wheel assembly handling and storage apparatus, as claimed in claim 1, wherein the lever mechanism is adaptable for pivotal mounting on a vehicle with its free end swingable from a release location where the flexible connector emerges from the vehicle to a secured location approximately twice its length away from its release location thereby shortening the effective length of the flexible connector to draw the spare tire and wheel assembly from a ground position clear of the vehicle to a stored position under the vehicle.

3. A spare tire and wheel assembly handling and storage apparatus, as claimed in claim 2, wherein the expandable, gripping fastener, comprises:

(a) an upright central body swaged to the flexible connector;
    (b) a lower body portion secured to the upright central body;
    (c) at least three sets of spaced bearing supports extending out from the lower body portion;
    (d) at least three pivotal arms pin mounted to the respective spaced bearing supports and notched on their outer sides near their freely pivotal ends; and
    (e) at least three springs moving on a bias, each pivotal arm away from the upright central body for ready notched engagement with the wheel assembly handling and storage apparatus.

4. A spare tire and wheel assembly handling and storage apparatus, as claimed in claim 3, wherein a second directional change supporting guide is adapted to be secured to the vehicle where the flexible connector emerges from the vehicle for its handling by the lever mechanism.

5. A spare tire and wheel assembly handling and storage apparatus, as claimed in claim 4, wherein a lock is used to firmly hold the lever mechanism in its secured location.

References Cited

UNITED STATES PATENTS

| 1,169,004 | 1/1916 | Cargin | 294—97 |
| 3,033,605 | 5/1962 | Morrow | 294—97 |
| 3,131,961 | 5/1964 | Van Doros | 294—97 |

FOREIGN PATENTS 845,521  10/1939  France.

EVON C. BLUNK, *Primary Examiner.*

H. C. HORNSBY, *Assistant Examiner.*